United States Patent Office 3,290,754
Patented Dec. 13, 1966

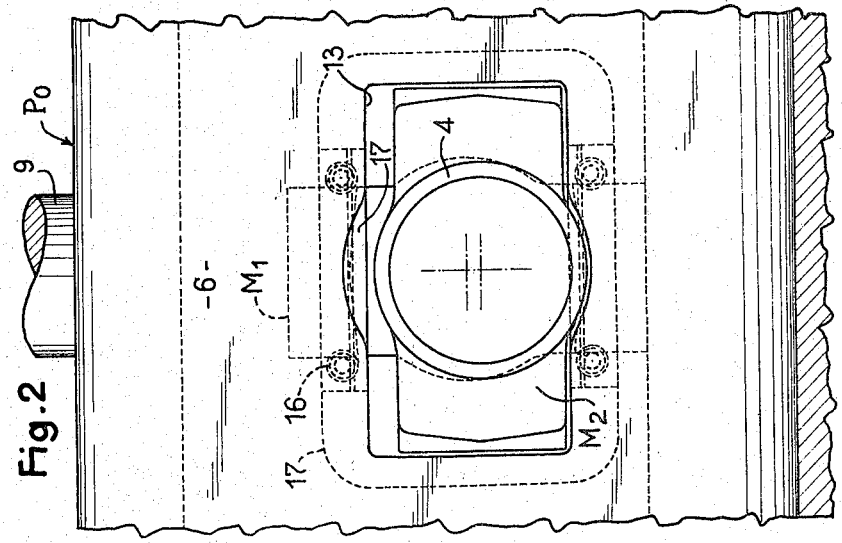
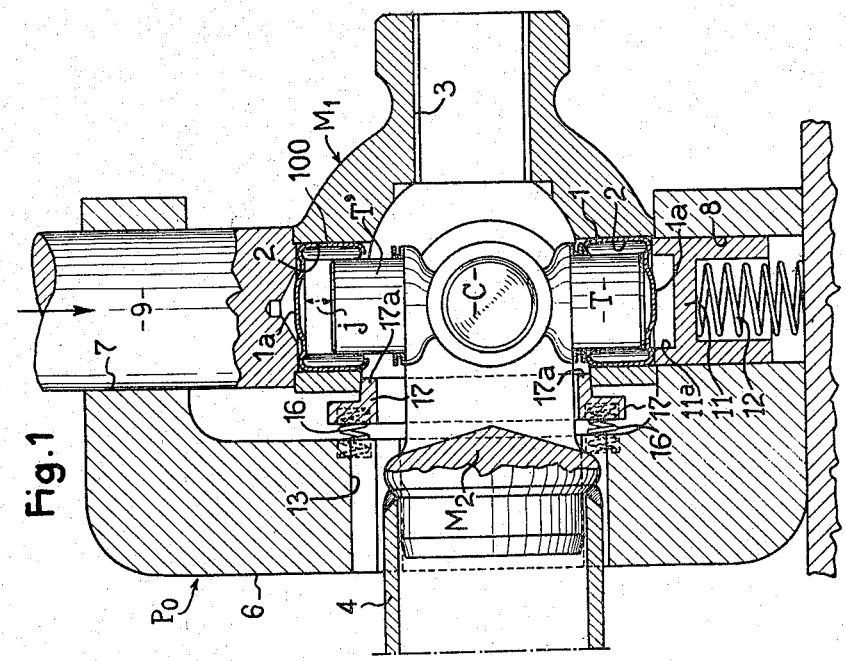

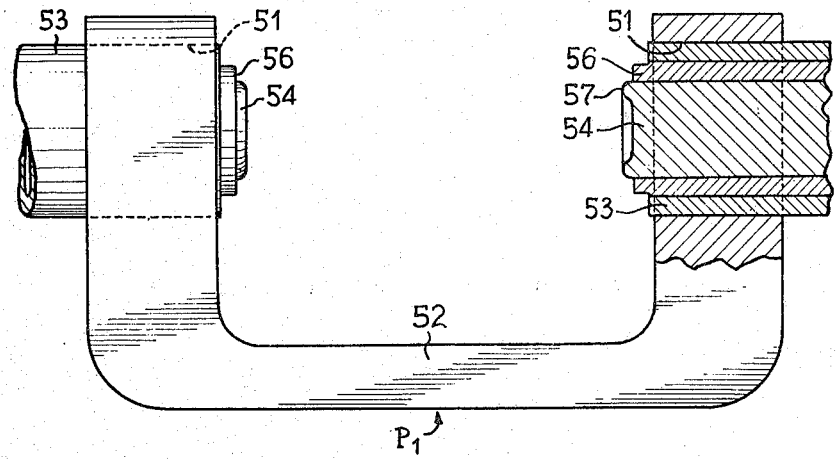
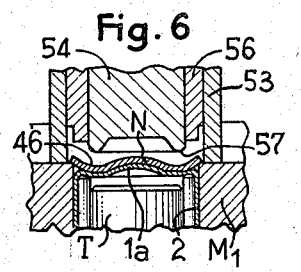
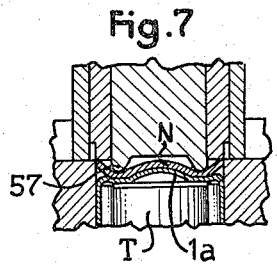
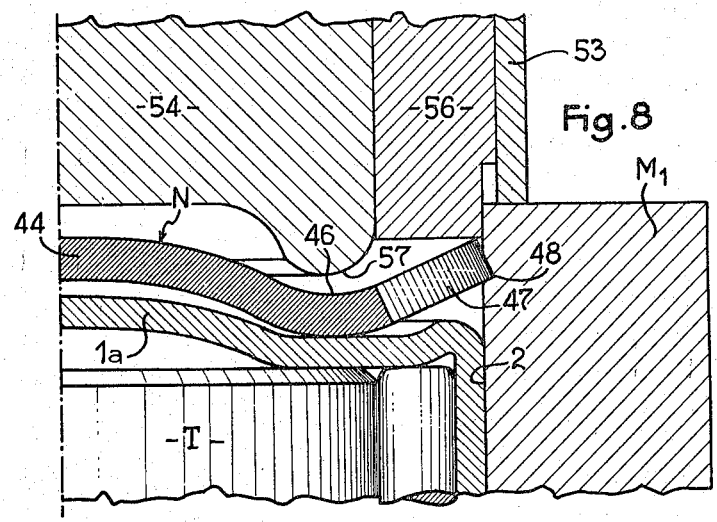

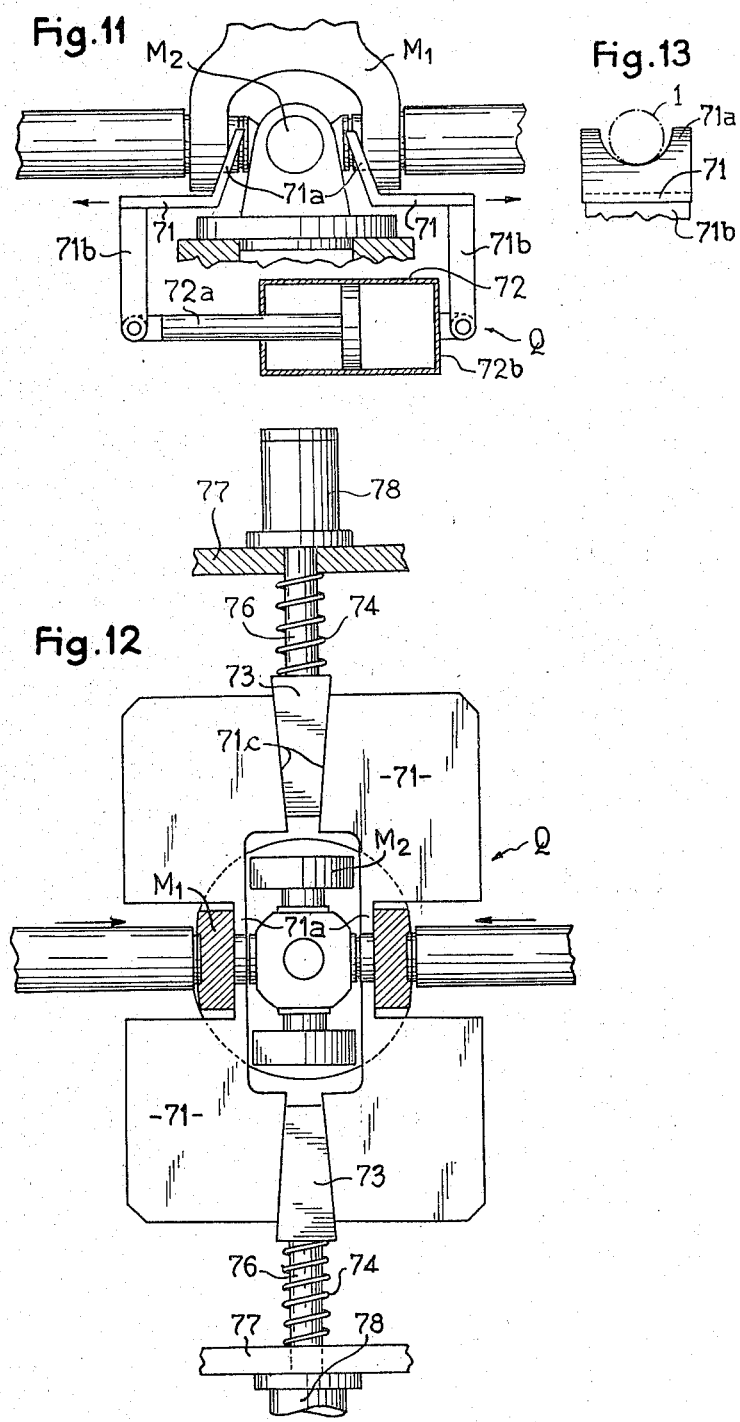

3,290,754
EQUIPMENT FOR ASSEMBLING UNIVERSAL JOINTS
Alfred Pitner, Paris, France, assignor to Nadella S.A., Seine-et-Oise, France, a French body corporate
Filed Oct. 12, 1964, Ser. No. 405,884
Claims priority, application France, Nov. 5, 1963, 952,758
12 Claims. (Cl. 29—33)

In universal transmission joints for automobile vehicles or other joints interconnecting shafts which are concurrent but unaligned and rotate at high speed, it is necessary that the elements termed yokes be very accurately centered relative to each other and have minimum clearance, since any eccentricity results in a lack of balance and unacceptable vibrations.

A method affording a highly accurate mounting comprises placing in the coaxial bores of the yokes the aligned pivots or trunnions together with the cups containing needles surrounding the latter and, while holding the axes of rotation of the yokes in exact coincidence, urging the bottoms of the cups into contact with the ends of the trunnions by sliding the cups through the medium of a retaining element which bears against the bottom of the corresponding cup and is fixed in this position inside the bore.

This fixing of the retaining element can be achieved in avoiding both a prior machining in the bore of retaining means at a predetermined position and any addition of material, but with such accuracy and reliability that the universal joint withstands the centrifugal axial forces when in service. These requirements are for example satisfied by using a retaining element which itself cuts into the bore in the appropriate region the recessed or protruding parts which retain it in the proper manner, such a retaining element performing the treble function of an abutment element for the cup, a possible reinforcement for the bottom of the latter, and a cutting tool which cuts the means for retaining said retaining element in the bore.

More exactly, this retaining element can have on its periphery either screwthreading adapted to tap the bore by a screwing of this element until the retaining element abuts the cup and the latter abuts the trunnion, or a cutting tool which is oriented and employed in such manner that the element is positioned by sliding it along the bore but that a return movement thereof is impossible owing to the radial expansion which accompanies the deep penetration of the cutting tool in the metal of the wall of the bore.

If desired, the retaining element can be constructed in the form of a circular disc which is retained in position in the bore by means of correctly located projections created from the metal of the bore when positioning the retaining element.

A clearance, which is exactly controlled and is positive or negative, can be provided between the end face of the trunnions and the bottoms of the cups by subjecting the yoke, when fixing the retaining element, to a controlled elastic deformation in the direction of one of the bores; this moves the two portions or arms of the yoke under consideration toward or away from each other so that after the retaining element has been fixed in position and the yoke has been released and has resumed its initial shape, the cups which have been made rigid therewith each move away from or toward the end of the corresponding trunnion.

The object of the invention is to provide improved equipment for carrying out the method just described in starting with a temporary universal joint assembly in which the needle-containing cups are placed in position with a rough clearance with respect to the trunnions within the bores of the yokes. This equipment comprises, in combination with a centering device which maintains the axes of rotation of the yokes in strict alignment, a device which supports and, if desired, deforms said yokes in a direction parallel with the axis of their bores, and a press which inserts simultaneously and pushes home in each of the bores of one of the yokes or of the two yokes a circular retaining element so as to make the bottom of the corresponding cup abut the face of the adjacent trunnion while fixing the retaining element in the bore.

The press is so adapted that the forces it exterts when it acts on the diametrally opposed cups are balanced in such manner as to maintain with full reliability the desired relative position of the component parts of the assembly.

Depending on whether the retaining elements are tapping tools or discs having peripheral cutting teeth or discs having a cylindrical periphery, the press is equipped with rotary screwing heads or double-acting mandrels, the function of the latter being to urge the cups against the trunnions and to deform the teeth of the retaining elements so that they penetrate the wall of the bores or deform the wall of the bore and produce retaining bosses which come in contact with the retaining element.

Further features and advantages of the invention will be apparent from the ensuing description, with reference to the accompanying drawings to which the invention is in no way limited.

In the drawings:

FIGS. 1 and 2 are views of a driving device or press for the temporary assembly of needle-containing cups and trunnions in the yokes of a universal joint;

FIG. 5 is a diagrammatic view of a driving device or press which is part of the equipment;

FIGS. 6–8 are views showing how the driving device or press shown in FIGS. 4 and 5 operates;

FIGS. 11 and 12 are diagrammatic views of the device insuring the tight or close mounting of the bottoms of the cups against the faces of the trunnions, and FIG. 13 is a detail view of the cradle-shape of the separating jaws shown in FIGS. 11 and 12.

Figure 4:
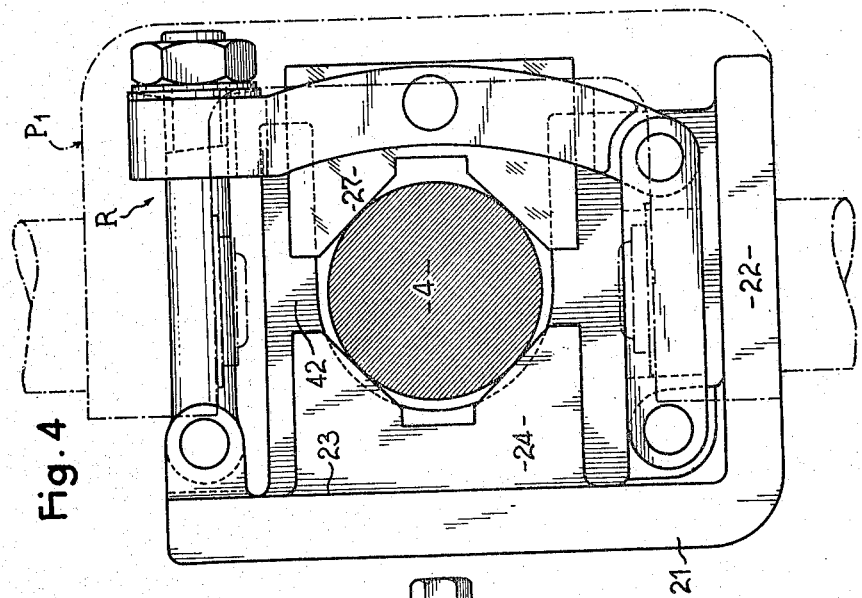
FIGS. 3 and 4 are views of equipment according to the invention and more particularly a centering device which is part of this equipment.

The driving device or press Po shown in FIGS. 1 and 2 is adapted to effect a pre-assembly of the component parts of a universal joint. More exactly, it concerns engaging needle-containing cups 1 in bores 2 formed in yokes $M_1$, $M_2$, a very wide clearance $j$ being provided between the bottom portions $1a$ of the cups and the corresponding trunnions T, T' of the cross-member C. In the presently-described embodiment the yoke $M_1$ is of the type having a splined sleeve 3, a tubular shaft 4 being welded on the yoke $M_2$.

The driving device or press Po includes a C-shaped stand 6 whose upper and lower branches are provided with coinciding bores or apertures 7, 8 in which are respectively slidable a mandrel 9 and a counter-mandrel 11. The latter is urged upwardly by a spring 12 and includes a bore $11a$ which is adapted to receive the trunnion T' and thus hold the cross-member in the desired position for the insertion of a cup 1 in the corresponding bore 2 around the trunnion T under the effect of the mandrel 9. In the position shown in FIG. 7 the second needle cup 100 of the yoke $M_1$ has just been placed in position after the latter has been turned over, whereas the yoke $M_2$ extends through a generally rectangular opening 13 formed in the vertical part of the stand 6.

Bearing against the edges of the opening 13 is one of the ends of springs 16 whose other end bears against a rigid member 17 in the shape of a rectangular frame having two convergent extension portions 17a. These two extension portions thus form a wedge which under the effect of the spring 16 is engaged between the arms of the yoke $M_1$, the latter having a corresponding shape. This arrangement precludes distortion of the yokes in particular when the mandrel 9 acts on the cups, then bears at the end of its travel against the top of the adjacent yoke arm as shown.

In inverting the yokes $M_1$ and $M_2$ in the press Po it is obviously possible to place the cups 1 in the yokes $M_2$ under conditions identical to those shown in FIG. 1 in respect of the yoke $M_1$ so as to obtain a temporary assembly in which the yokes and the trunnions have a large relative clearance in both directions of the bores of the yokes of the joint.

This inversion can be obtained by merely rotating the whole of the joint through 90° about its main axis if the member 17 is extensible and independent as will be described hereinafter with reference to FIG. 3.

Figure 3:
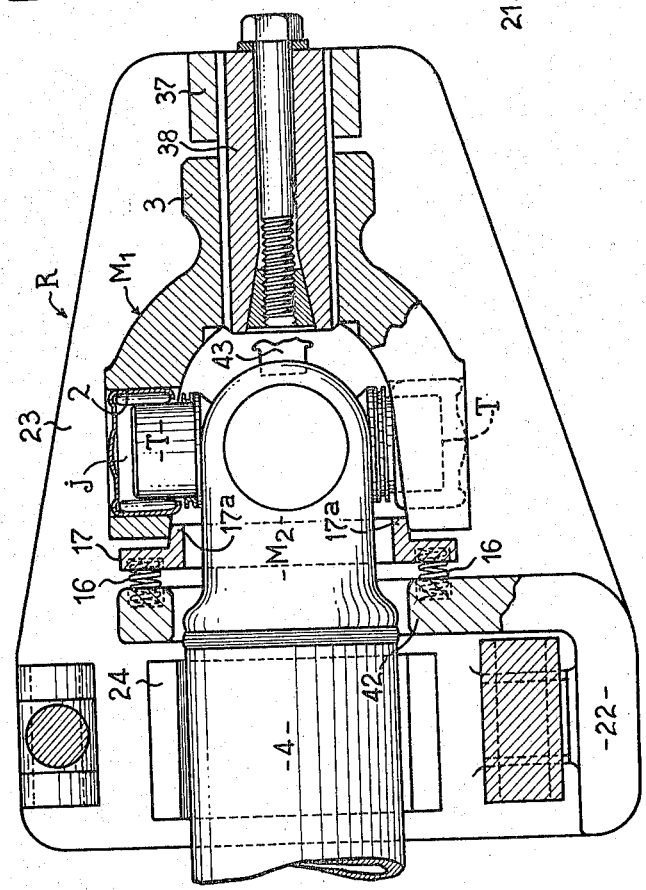

The equipment according to the invention shown in FIG. 3 achieves a final accurate assembly without relative clearance or with a predetermined clearance. This equipment comprises a centering device R for putting the axes of rotation of the two yokes in strict alignment, and a driving device or press $P_1$ adapted to insert retaining elements in the bores 2 so as to finally fix the cups 1 in position. This device (FIGS. 3 and 4) and this press (FIG. 5) are shown separately for reasons of clarity, the press $P_1$ being however represented symbolically in FIG. 4 in dot-dash line also in order to show the relative independence of the press and centering device, as will be explained hereinafter.

The centering device R comprises a stand 21 which is supported in an appropriate manner by its foot 22 and is provided with means for centering respective yokes.

For example, secured at one end of a plate 23 which is perpendicular to the foot 22 is a V 24. The shaft 4 of the yoke $M_2$ is clamped by a movable jaw 27 of similar shape.

To center the yoke $M_1$ a collar 37 is fixed at the other end of the plate 23 and receives a splined mandrel 38 on which is mounted the splined sleeve 3 of the yoke $M_1$. In the presently-described embodiment this mandrel is expansible.

In order to preclude any distortion of the yoke $M_1$ when the press $P_1$ is in action, a spacer member 17, identical to the corresponding member shown in FIGS. 1 and 2, is interposed between the arms of the yoke and is biased by springs 16 which bear against the edges of a recess formed in a web 42 rigid with the stand 21. Reference numerical 43 denotes a spacer member, represented diagrammatically which performs the same function with respect to the yoke $M_2$ that the spacer member 17 performs with respect to the yoke $M_1$.

The member 17 can also be extensible, its extended portions 17a being for example separated by the action of a screw having an axis parallel with the axis of the bores 2, the unit consisting of the member 17 and the screw in question being independent from the stand 21.

In the device shown in FIGS. 3 and 4 the axes of rotation of the two yokes are held in coincidence which is possible owing to the existence of the clearance $j$ notwithstanding inevitable out of true due to machining. The action of the press $P_1$ eliminates this clearance by urging a retaining element N into each of the two bores of the same yoke and by fixing this element in position after having applied the bottom portion of the cup against the face of the corresponding trunnion.

In the embodiment shown in FIGS. 6, 7 and 8 the retaining element N has the general shape of a disc including a crowned or convex central part 44 which defines an angular recess 46 having a concavity in the direction opposed to that of the crowned or convex central part and whose outer side or marginal portion is formed by peripheral teeth 47 having a cutting ridge or edge 48.

The driving device or press $P_1$ (FIG. 5) comprises within each of two coincident bores 51 formed in the respective branches of the C-shaped stand 52, a double-acting mandrel capable of sliding within a tubular guide 53 which is movable in the bore 51. Each mandrel includes a piston 54 movable within a cylinder 56. The operative end of the piston 54 has an annular rib 57 whose diameter is the same as the recess 46 in the disc N and if desired includes at its centre a permanent magnet the purpose of which is to facilitate insertion of the retaining element and insure that the latter does not fall away from the mandrel. As concerns the cylinder 56 encompassing the piston 54 it is provided for acting on the peripheral teeth 47.

The forces exerted by the two mandrels of the press $P_1$ for positioning the retaining element and cups in the two bores of the same yoke have a hydraulic, pneumatic or mechanical origin but they must be balanced so as to avoid any danger of distortion which would modify the relative position of the component parts as determined by the centering device R. This balanced condition is obtained either by employing the same hydraulic or pneumatic pressure for actuating the two mandrels or by providing a floating assembly for the press, that is to say the press $P_1$ is independent from the centering device R so that for a given action on one of the cups by one of the mandrels results in an equal reaction on the other cup by the other mandrel.

FIG. 6 shows the initial position of one mandrel of the press $P_1$ disposed in vertical alignment with the bore 2 of the yoke $M_1$. The guide 53 bears against the top of the yoke and the piston 54 distinctly protrudes from the cylinder 56. Owing to the restricted penetration of the cup 1 into the bore 2 (FIG. 1) the retaining element is in contact with the bottom of the cup so that no tilting occurs in the course of the operation described hereinafter. In FIG. 7 the piston and the cylinder have been lowered together so that the rib 57, in bearing against the bottom of the recess 46, has urged the retaining disc N into contact with the bottom 1a of the cup and has consequently put this bottom into abutting relation with the face of the trunnion T.

The piston 54 is slightly raised from the position shown in FIG. 7 so that it is no longer in contact with the disc N and the cylinder 56 is lowered and thus urges downwardly the peripheral teeth 47 and causes the cutting ends 48 to penetrate the wall of the bore 2.

When the two cups of the yoke $M_1$ have been fixed in position the cups of the yoke $M_2$ can be fixed in position by modifying the position of the yokes in the centering device R shown in FIGS. 3 and 4 so that the bores of the yoke $M_2$ come into vertical alignment with the mandrels of the press $P_1$.

Figure 10:
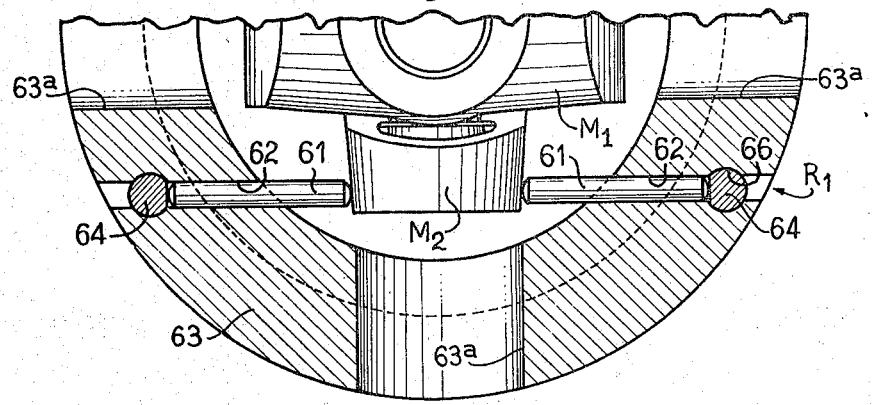
FIGS. 9 and 10 are views of another embodiment of the centering device.
Figure 9:
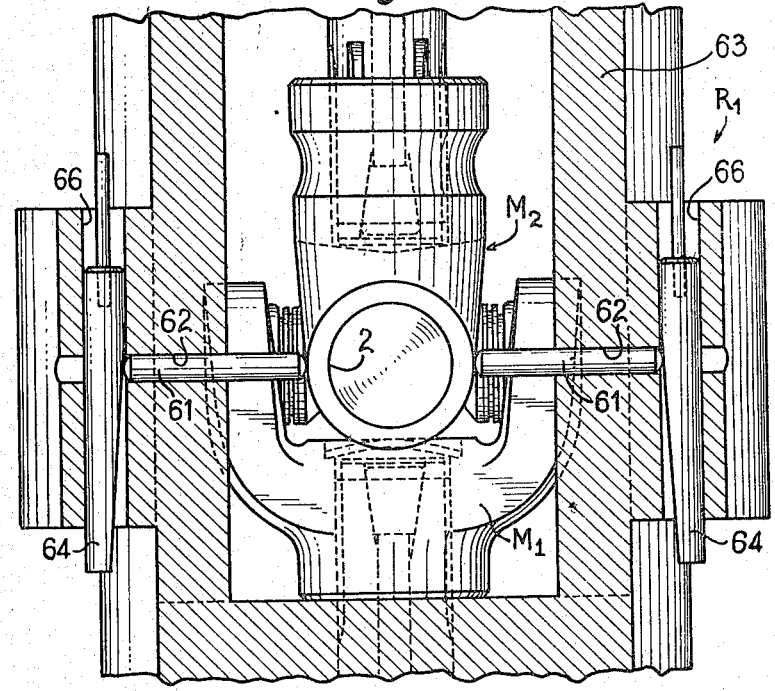

FIGS. 9 and 10 show diagrammatically a variant of a centering device $R_1$ in which each of the yokes $M_1$, $M_2$ is supported by a splined mandrel. However, in this case, in order to avoid that the relatively large overhang or unsupported part of the arms of the yokes does not adversely affect the behaviour of the parts to be assembled by the press $P_1$, a transverse support system is provided for the arms of the yoke which is not directly subjected to the action of the press, namely yoke $M_2$ in the illustrated embodiment. Indeed, notwithstanding the precautions taken to distribute, as mentioned hereinbefore, the forces equally between the two arms of the yoke $M_1$ and the two faces of the trunnions T and T', there could occur a noticeable disequilibrium having regard to the accuracy desired, between the forces applied to the faces, the resultant of these forces being transmitted to the pair of trunnions placed in the yoke $M_2$ and exterting a transverse force on this yoke. This system comprises essentially for each yoke arm maintaining means in the form of two pins 61 in contact with the opposite sides of the yoke, the common line of action of the pins approximately intersecting the centre of the corresponding bore 2. These pins extend through apertures 62 formed in the stand 63 of the device and they are locked in position by keys 64 which are in contact with those ends of the pins which are remote from the yoke and are inserted in lateral bores 66 formed in the stand 63.

When it is desired to obtain instead of the assembly without clearance between the cups 1 and the trunnions T just described, a tight assembly namely an assembly with negative clearance or interference fit, it is possible to employ a device for expanding the yokes such as that shown in FIGS. 11 and 12, which replaces the spacer member or ring 17 shown in FIGS. 3 and 4.

The expanding device Q comprises essentially two jaws 71 which through the medium of their operative portion 71a come into contact with the inner face of the respective arms of the yoke $M_1$ to be deformed. These jaws can be moved away from one another by a jack 72 whose piston rod 72a and cylinder 72b are connected to an arm 71b of the respective jaws. The two jaws comprise moreover faces 71c which converge in the direction of the yoke and between which a wedge 73 is applied under the action of a spring 74 which surrounds a rod 76 rigid with the wedge 73 and bears against a fixed support 77. The rod 76 could moreover constitute the rod of a jack 76 which could be actuated so as to withdraw the wedge 73, which constitutes a locking element, in opposition to the action of the spring 74.

When the expanding jack 72 has elastically spread apart the two arms of the yoke $M_1$ to the desired extent, the yoke $M_1$ is locked in this deformed position by the wedge 73. The pressure of the expanding jack 72 is then released and the press $P_1$ is brought into action. After the cups have been mounted, the jaws 71 are unlocking by acting on the jack 78. Removal of the spreading forces acting on the arms of the yoke $M_1$ is therefore manifested by a tightening or clamping action, the magnitude of which is exactly determined by the amplitude of the elastic deformation created by the expanding jack 72.

In order to facilitate the centering of the bores of the yoke $M_1$ with respect to the mandrel 56, the portions 71a have been shaped in the form of a cradle so as to receive the inner end of the cups 1 and 100 (FIG. 13).

If a positive clearance is desired between the cups and the trunnions, the elastic deformation must be such as to tend to move the yoke arms toward one another. In this case, an assembly of a known type could be employed.

Although specific embodiments of the invention have been described, many modifications and changes may be made therein without departing from the scope of the invention as defined in the appended claims.

Thus if the retaining elements are in the form of tapping tools, the driving device $P_1$ is equipped with screwing heads instead of mandrels for rotating the taps. However, it should be mentioned that the retaining disc N described could have teeth whose cutting end has the shape of helical ramps so that the retaining element could be urged into the wall of the bore by means of a mandrel press, but, if desired, extracted by unscrewing and placed back by screwing when carrying out repairs.

It will be clear that the centering device R could be adapted for the utilisation of a double press $P_1$ which is capable of simultaneously mounting cups in both yokes.

Having now described my invention what I claim as new and desire to secure by Letters Patent is:

1. Equipment for accurately mounting needle-containing cups in bores in arms of a first yoke and a second yoke of a universal joint and fixing the position of said cups by means of retaining elements which engage said bores, said universal joint including four trunnions of a cross-member which are located in said bores and have end faces extending transversely of the trunnions, said cups being already disposed in said bores with a clearance between said cups and said faces of said trunnions, said equipment comprising in combination a centering device for maintaining the axes of rotation of said yokes in strict alignment with each other and a driving device for simultaneously driving two of said retaining elements through said bores of said first yoke and against the corresponding cups thereby urging said cups through said bores and against said faces of the corresponding trunnions so as to cause said cups to abut said faces of the corresponding trunnions, said driving device also fixing said retaining element in positions in said bores.

2. Equipment for accurately mounting needle-containing cups in bores in arms of a first yoke and a second yoke of a universal joint and fixing the position of said cups by means of retaining elements which engage said bores, said universal joint including four trunnions of a cross-member which are located in said bores and have faces extending transversely of the trunnions, said cups being already disposed in said bores with a clearance between said cups and said faces of said trunnions, said equipment comprising in combination a centering device for maintaining the axes of rotation of said yokes in strict alignment with each other and a press for simultaneously driving two of said retaining elements through said bores of said first yoke and against the corresponding cups thereby urging said cups through said bores and against said faces of the corresponding trunnions so as to cause said cups to abut said faces of the corresponding trunnions, said press fixing said retaining elements in position in said bores.

3. Equipment as claimed in claim 2, comprising a support device having wedge means which are mounted to float with respect to said centering device and adapted to be engaged between said arms of said first yoke so as to prevent said arms from moving towards each other.

4. Equipment as claimed in claim 2, comprising a support device mounted to float relative to said centering device and having jaws engaged between the respective arms of said first yoke and means for shifting the jaws in such manner as to elastically spread apart said arms.

5. Equipment as caimed in claim 4, wherein said press comprises two mandrels which are urged towards each other for driving said retaining elements and said jaws include portions in the shape of a cradle adapted to receive and guide the ends of said cups adjacent said trunnion faces and thus insure an accurate positioning of the axes of the bores with respect to the axes of the mandrels.

6. Equipment as claimed in claim 4, comprising withdrawable locking means for locking the jaws in the position corresponding to the desired elastic deformation of said arms of said first yoke.

7. Equipment as claimed in claim 2, wherein said centering device further comprises a device including maintaining means adapted to maintain the arms of the second yoke in a direction perpendicular to a plane containing the axis of rotation of the second yoke and the axis of the corresponding trunnion.

8. Equipment as claimed in claim 7, wherein said maintaining means comprise four pins slidably mounted relative to said second yoke in a plane which is perpendicular to the axis of rotation of said second yoke and contains the axes of the bores of the arms of said second yoke, two of said four pins having ends which are adapted to engage both sides of one of said arms of said second yoke and the other two of said four pins having ends which are adapted to engage both sides of the other of said arms of said second yoke and means for locking said pins in engagement with said arms of said second yoke.

9. Equipment as claimed in claim 2, wherein said press is mounted to float relative to said centering device so as to avoid any reaction on the latter.

10. Equipment as claimed in claim 2, for positioning a retaining element constructed in the form of a disc provided with peripheral teeth which are raised with respect to the mean plane of the disc, wherein each press mandrel comprises a cylinder and a piston movable within the cylinder, said piston and cylinder being adapted respectively to push the disc until the bottom portion of the cup comes into contact with the face of the trunnions and to bend down the peripheral teeth and cause them to penetrate the wall of the bore.

11. Equipment for accurately mounting needle-containing cups in bores in arms of a first yoke and a second yoke of a universal joint and fixing the position of said cups by means of retaining elements which engage said bores, said universal joint including four trunnions of a cross-member which are located in said bores and have faces extending transversely of the trunnions, said cups being already disposed in said bores with a clearance between said cups and said faces of said trunnions, and each of said retaining elements being in the form of a disc having peripheral teeth which are offset axially of the corresponding bore of the yoke from a mean plane of the disc in a direction away from said face of the corresponding trunnion, said equipment comprising in combination a centering device for maintaining the axis of rotation of said yokes in strict alignment with each other and a press comprising two cylinders slidably mounted in a stand and respectively adapted to engage said teeth of said retaining elements in said bores of said first yoke, said cylinders having aligned axes in alignment with the axes of said bores of said first yoke, two pistons respectively axially slidably mounted in said cylinders and adapted to engage said retaining elements in said bores of said first yoke, said cylinders and pistons being located on opposite sides of said first yoke with respect to the axis of rotation of said first yoke, said pistons and cylinders being adapted to press said retaining elements through said bores of said first yoke until said retaining elements cause the corresponding cups to abut said faces of the corresponding trunnions after which said cylinders urge said teeth of said retaining elements further towards said faces of the corresponding trunnions and cause said teeth to penetrate the surface of said bores of said first yoke and thus fix said retaining elements in position in said bores.

12. Equipment for accurately mounting needle-containing cups in bores in arms of a first yoke and a second yoke of a universal joint and fixing the position of said cups by means of retaining elements which engage said bores, said universal joint including four trunnions of a cross-member which are located in said bores and have faces extending transversely of the trunnions, said cups being already disposed in said bores with a clearance between said cups and said faces of the trunnions, said equipment comprising in combination a centering device for maintaining the axes of rotation of said yoke in strict alignment with each other and pressing means for simultaneously pressing two of said retaining elements through said bores of said first yoke and against the corresponding cups thereby urging said corresponding cups through said bores against said faces of the corresponding trunnions, said centering device comprising a stand, first fixing means for fixing said first yoke in position relative to said stand, second fixing means for fixing said second yoke in position relative to said stand, the relative positions of said two fixing means being such that said yokes have their axes of rotation in strict alignment with each other, said pressing means comprising a stand having two branches in each of which is slidably mounted pressing elements adapted to engage said retaining elements in said bores of said first yoke, said pressing elements being capable of exerting pressure on said retaining elements when connected to a source of pressure so as to urge the corresponding cups against said faces of the corresponding trunnions.

No references cited.

RICHARD H. EANES, JR., *Primary Examiner.*

UNITED STATES PATENT OFFICE
CERTIFICATE OF CORRECTION

Patent No. 3,290,754          Dated December 13, 1966

Inventor(s) Alfred Pitner

It is certified that error appears in the above-identified patent and that said Letters Patent are hereby corrected as shown below:

In the heading, column 1, line 4, --of one-half interest-- should be inserted after "assignor".

SIGNED AND
SEALED
OCT 27 1970

(SEAL)
Attest:

Edward M. Fletcher, Jr.
Attesting Officer

WILLIAM E. SCHUYLER, JR.
Commissioner of Patents